(12) United States Patent
Saliba et al.

(10) Patent No.: US 7,826,169 B2
(45) Date of Patent: Nov. 2, 2010

(54) SERVO ERROR DETECTION AND COMPENSATION UTILIZING VIRTUAL DATA TRACKING SERVO METHODS

(75) Inventors: George A. Saliba, Boulder, CO (US); Theron S. White, Boulder, CO (US); Amir Djalali, Niwot, CO (US); Hong Chen, Boulder, CO (US)

(73) Assignee: Quantum Corporation, San Jose, CA (US)

( * ) Notice: Subject to any disclaimer, the term of this patent is extended or adjusted under 35 U.S.C. 154(b) by 741 days.

(21) Appl. No.: 11/789,922

(22) Filed: Apr. 25, 2007

(65) Prior Publication Data

US 2008/0266705 A1  Oct. 30, 2008

(51) Int. Cl.
*G11B 5/584* (2006.01)

(52) U.S. Cl. .................. 360/77.12; 360/48; 360/75; 360/78.02

(58) Field of Classification Search .................. None
See application file for complete search history.

(56) References Cited

U.S. PATENT DOCUMENTS

| | | | |
|---|---|---|---|
| 2,937,239 | A | 5/1960 | Garber, Jr. et al. |
| 3,633,038 | A | 1/1972 | Falk |
| 3,829,895 | A | 8/1974 | Tanaka et al. |
| 3,919,697 | A | 11/1975 | Walker |
| 3,971,002 | A | 7/1976 | Bricot et al. |
| 4,056,830 | A | 11/1977 | Smith |
| 4,110,799 | A | 8/1978 | Bergmans et al. |
| 4,149,204 | A | 4/1979 | Marino et al. |
| 4,176,381 | A | 11/1979 | de Niet et al. |
| 4,321,634 | A | 3/1982 | Lehureau |
| 4,334,252 | A | 6/1982 | Toriu |
| 4,392,163 | A | 7/1983 | Rijckaert et al. |
| 4,414,589 | A | 11/1983 | Oliver et al. |
| 4,422,112 | A | 12/1983 | Tanaka |

(Continued)

FOREIGN PATENT DOCUMENTS

EP  0 854 471 A1  7/1998

(Continued)

OTHER PUBLICATIONS

Yoshikawa, A. et al. (May 1995). "Laser-Detector-Hologram Unit for Thin Optical Pick-Up Head of a CD Player," *IEEE Transactions On Components, Packaging, and Manufacturing Technology—Part B* 18(2):245-249.

*Primary Examiner*—Dismery E Mercedes
(74) *Attorney, Agent, or Firm*—Baker Botts L.L.P.

(57) ABSTRACT

A method for detecting errors in a servo system of a magnetic storage drive includes writing a plurality of data tracks at a pitch, detecting a position of an edge of at least two of the data tracks under control of a servo system (e.g., an optical or magnetic servo system), and determining an error in the servo system based on the detected positions and known pitch of the data tracks. Differences in the track edge positions of the tracks from the positions at which they were written may indicate errors in the optical servo system (e.g., non-linearity errors, as well as other errors such as electrical, temperature, or the like). Determined errors may be stored with a look-up table of positional errors or used to normalize a position algorithm associated with the servo system.

30 Claims, 8 Drawing Sheets

U.S. PATENT DOCUMENTS

| | | | |
|---|---|---|---|
| 4,424,541 A | 1/1984 | Koinuma et al. | |
| 4,439,793 A | 3/1984 | Nater | |
| 4,449,082 A | 5/1984 | Webster | |
| 4,472,750 A | 9/1984 | Klumpp et al. | |
| 4,479,156 A | 10/1984 | Kumagai et al. | |
| 4,502,082 A | 2/1985 | Ragle et al. | |
| 4,539,615 A | 9/1985 | Arai et al. | |
| 4,551,777 A | 11/1985 | Saito et al. | |
| 4,679,104 A | 7/1987 | Dahlerud | |
| 4,685,005 A | 8/1987 | Fields, Jr. | |
| 4,802,030 A | 1/1989 | Henry et al. | |
| 4,816,939 A | 3/1989 | Ford et al. | |
| 4,866,548 A | 9/1989 | Rudi | |
| 4,975,791 A | 12/1990 | Eggebeen | |
| 4,979,051 A | 12/1990 | Eggebeen | |
| 5,003,412 A * | 3/1991 | Bizjak et al. | 360/77.01 |
| 5,050,017 A | 9/1991 | Carr et al. | |
| 5,055,959 A | 10/1991 | Saliba | |
| 5,072,319 A | 12/1991 | Kohri et al. | |
| 5,121,270 A | 6/1992 | Alcudia et al. | |
| 5,126,895 A | 6/1992 | Yasuda et al. | |
| 5,132,861 A | 7/1992 | Behr et al. | |
| 5,257,148 A | 10/1993 | Solhjell et al. | |
| 5,262,908 A | 11/1993 | Iwamatsu et al. | |
| 5,285,331 A | 2/1994 | White | |
| 5,289,328 A | 2/1994 | Saliba | |
| 5,294,791 A | 3/1994 | Pahr | |
| 5,294,803 A | 3/1994 | Pahr | |
| 5,321,570 A | 6/1994 | Behr et al. | |
| 5,371,638 A | 12/1994 | Saliba | |
| 5,426,551 A | 6/1995 | Saliba | |
| 5,448,430 A | 9/1995 | Bailey et al. | |
| 5,452,152 A | 9/1995 | Rudi | |
| 5,488,519 A | 1/1996 | Ishida et al. | |
| 5,523,904 A | 6/1996 | Saliba | |
| 5,563,868 A | 10/1996 | Farnsworth et al. | |
| 5,588,007 A | 12/1996 | Ma | |
| 5,600,500 A | 2/1997 | Madsen et al. | |
| 5,600,505 A | 2/1997 | Ayres | |
| 5,615,205 A | 3/1997 | Belser | |
| 5,617,269 A | 4/1997 | Gordenker et al. | |
| 5,680,269 A | 10/1997 | Georgis et al. | |
| 5,757,575 A | 5/1998 | Hallamasek et al. | |
| 5,781,516 A * | 7/1998 | Yamada | 369/30.13 |
| 5,796,537 A | 8/1998 | Goker et al. | |
| 5,815,337 A | 9/1998 | Milo | |
| 5,844,814 A | 12/1998 | Chliwnyj et al. | |
| 5,847,892 A | 12/1998 | Goker | |
| 5,862,014 A | 1/1999 | Nute | |
| 5,940,238 A | 8/1999 | Nayak et al. | |
| 5,949,604 A | 9/1999 | Saliba | |
| 5,973,872 A | 10/1999 | Saliba | |
| 5,973,874 A | 10/1999 | Panish et al. | |
| 5,978,188 A | 11/1999 | Kaaden et al. | |
| 5,982,711 A | 11/1999 | Knowles et al. | |
| 6,005,737 A | 12/1999 | Connolly et al. | |
| 6,018,434 A | 1/2000 | Saliba | |
| 6,061,199 A | 5/2000 | Goker et al. | |
| 6,075,678 A | 6/2000 | Saliba | |
| 6,084,740 A | 7/2000 | Leonhardt et al. | |
| 6,088,184 A | 7/2000 | Hu | |
| 6,108,159 A | 8/2000 | Nute et al. | |
| 6,118,605 A | 9/2000 | Call et al. | |
| 6,128,155 A | 10/2000 | Sugawara et al. | |
| 6,130,792 A | 10/2000 | Goker | |
| 6,134,072 A | 10/2000 | Zweighaft | |
| 6,141,174 A | 10/2000 | Judge et al. | |
| 6,166,874 A | 12/2000 | Kim | |
| 6,185,063 B1 | 2/2001 | Cameron | |
| 6,188,532 B1 | 2/2001 | Albrecht et al. | |
| 6,222,698 B1 | 4/2001 | Barndt et al. | |
| 6,236,529 B1 | 5/2001 | Leonhardt et al. | |
| 6,239,939 B1 | 5/2001 | Bui et al. | |
| 6,246,535 B1 | 6/2001 | Saliba et al. | |
| 6,275,349 B1 | 8/2001 | Smith | |
| 6,275,350 B1 | 8/2001 | Barndt | |
| 6,285,519 B1 * | 9/2001 | Goker | 360/48 |
| 6,307,718 B1 | 10/2001 | Kasetty | |
| 6,331,920 B1 | 12/2001 | Albrecht et al. | |
| 6,339,522 B1 | 1/2002 | Hoelsaeter et al. | |
| 6,366,422 B1 | 4/2002 | Daniel et al. | |
| 6,433,951 B1 | 8/2002 | Lubratt | |
| 6,493,174 B1 | 12/2002 | Stubbs | |
| 6,512,651 B1 | 1/2003 | Eifert et al. | |
| 6,545,837 B1 | 4/2003 | Tran | |
| 6,570,731 B2 | 5/2003 | Zweighaft et al. | |
| 6,700,729 B1 | 3/2004 | Beck et al. | |
| 6,768,608 B2 * | 7/2004 | Saliba et al. | 360/77.03 |
| 6,775,083 B2 | 8/2004 | Hilla, Jr. et al. | |
| 6,775,092 B2 | 8/2004 | Zweighaft et al. | |
| 6,801,383 B2 * | 10/2004 | Zweighaft et al. | 360/77.12 |
| 6,839,196 B2 | 1/2005 | Trivedi | |
| 6,903,895 B2 | 6/2005 | Chliwnyj et al. | |
| 7,012,775 B2 * | 3/2006 | Suzuki et al. | 360/75 |
| 7,085,095 B2 | 8/2006 | Saliba et al. | |
| 7,102,845 B2 | 9/2006 | Saliba et al. | |
| 7,106,535 B2 * | 9/2006 | Magnusson | 360/64 |
| 7,116,514 B2 * | 10/2006 | Mahnad et al. | 360/77.12 |
| 7,136,255 B2 | 11/2006 | Mahnad et al. | |
| 7,139,152 B2 | 11/2006 | Mahnad et al. | |
| 7,149,050 B2 | 12/2006 | Saliba et al. | |
| 7,184,233 B2 | 2/2007 | Zweighaft | |
| 7,330,322 B2 * | 2/2008 | Hanson et al. | 360/48 |
| 7,405,898 B2 * | 7/2008 | Eleftheriou et al. | 360/77.07 |
| 2002/0021524 A1 | 2/2002 | Saliba et al. | |
| 2002/0176200 A1 | 11/2002 | Trivedi | |
| 2003/0043498 A1 | 3/2003 | Johnson et al. | |
| 2004/0042115 A1 | 3/2004 | Saliba et al. | |
| 2005/0083600 A1 | 4/2005 | Mahnad et al. | |
| 2005/0083601 A1 | 4/2005 | Mahnad et al. | |
| 2005/0083602 A1 | 4/2005 | Saliba et al. | |
| 2005/0088770 A1 | 4/2005 | Saliba et al. | |
| 2005/0088776 A1 | 4/2005 | Saliba et al. | |
| 2005/0094308 A1 | 5/2005 | Mahnad et al. | |
| 2005/0270687 A1 | 12/2005 | Zweighaft | |
| 2006/0209450 A1 | 9/2006 | Saliba | |
| 2009/0213488 A1 * | 8/2009 | Saliba et al. | 360/77.12 |

FOREIGN PATENT DOCUMENTS

| | | |
|---|---|---|
| EP | 0 854 471 B1 | 7/1998 |
| EP | 0 919 990 A2 | 6/1999 |
| EP | 0 919 990 A3 | 6/1999 |
| EP | 0 996 127 A2 | 4/2000 |
| EP | 0 996 127 A3 | 4/2000 |
| EP | 0 996 127 B1 | 4/2000 |
| JP | 59-185020 A | 10/1984 |

* cited by examiner

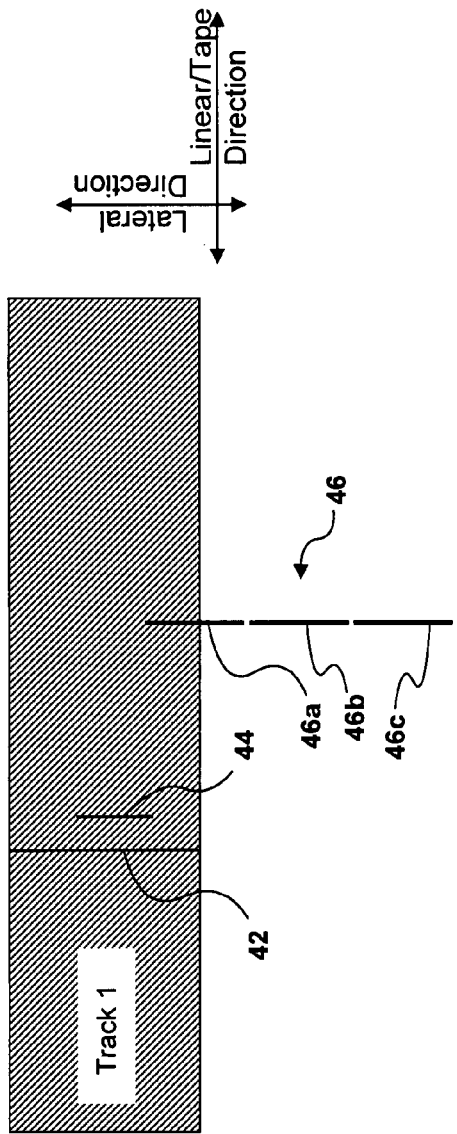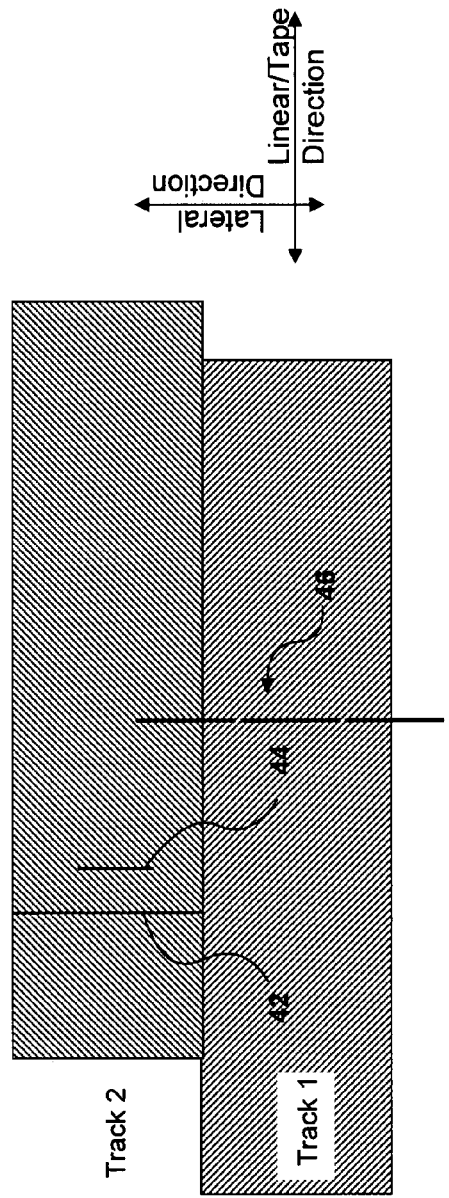
Figure 3
Figure 4

SERVO ERROR DETECTION AND COMPENSATION UTILIZING VIRTUAL DATA TRACKING SERVO METHODS

BACKGROUND

1. Field

The invention relates generally to magnetic tape storage devices and systems, and more particularly to methods and systems for detecting and compensating for errors in a head position servo system of a magnetic tape storage drive.

2. Related Art

Increased data storage capacity, and retrieval performance, is desired of all commercially viable mass storage devices and media. In the case of linear tape recording a popular trend is toward multi-head, multi-channel fixed head structures with narrowed recording gaps and data track widths so that many linear data tracks may be achieved on a tape medium of a predetermined width, such as one-half inch width tape. To increase the storage density for a given cartridge size the bits on the tape may be written to smaller areas and on a plurality of parallel longitudinal tracks. As more data tracks are recorded on a tape, each track becomes increasingly narrow. The tape therefore becomes more susceptible to errors caused from the tape shifting up or down (called lateral tape motion or "LTM") in a direction perpendicular to the tape travel path as the tape passes by the magnetic head.

Various servo techniques for tracking data tracks despite LTM are known, thereby increasing the track density and data storage capacity for a given size storage device. For example, recording servo information on the tape to provide positioning information to a tape drive system during writing and/or reading processes. Some systems include a magnetic or optical track of servo information which is detected and used as a position reference signal. For example, a variety of techniques have been used including dedicated and embedded magnetic servo tracks, time and amplitude magnetic servo tracks, optical servo tracks, tape edge detection, and the like. Other systems may intersperse or embed servo information with user data.

Such traditional servo techniques, however, may have errors associated therewith that limit the precision of the servo systems. For example, an optical servo system may include a detector for detecting the position of optically detectable indicia (e.g., dots or servo marks) associated with the storage medium. Errors, including non-linear errors, may result from a mismatch of an optical laser "spot" to the optically detectable indicia on the tape. Such errors may limit how narrow and dense tracks may be positioned for a given servo system.

BRIEF SUMMARY

According to one aspect of the present invention methods and systems are provided for determining errors in a servo system (e.g., an optical or magnetic servo system) associated with a tape drive. In one example, a method for detecting errors in a servo system includes writing a plurality of data tracks to a storage medium at a pitch, detecting a position of an edge of at least two of the plurality of data tracks under control of a servo system (e.g., an optical servo system), and determining an error in the servo system based on the detected positions and the pitch of the data tracks. In one example, the plurality of data tracks are written according to a track trimming format (and without use of the drive servo system), wherein a first track is written to the storage medium followed by a second track partially overlapping or "trimming" the first track. Subsequent tracks each trim a previously written track forming a plurality of tracks at a known pitch.

In one example, a read element detects the positions of track edges under control of the servo system. Differences in the track edge positions or pitch of the plurality of data tracks from the pitch at which they were written may indicate errors in the optical servo system (e.g., non-linear errors, as well as other errors such as electrical, temperature, or the like). Determined errors may be stored with a look-up table of positional errors or used to normalize a position algorithm associated with the servo system, thereby compensating for errors in the servo system.

In one example, first and second sets of data tracks are written in parallel by different write elements of a multi-channel head. For example, a first and second plurality of data tracks may be written to different bands or regions of the storage medium. Track edges may be detected by different read elements of the multi-channel head for determining errors in the servo system. Additionally, a virtual writer and virtual reader determined from the at least first and second write elements and read elements respectively may be used to determine errors in the servo system.

According to another aspect and example, a head positioning servo system is provided. In one example, a head positioning servo system includes a transducer head assembly having a magnetic write and read element, a servo system, and a controller. The controller includes logic for writing a first plurality of data tracks to a storage medium at a pitch according to a track trimming format, detecting a position of an edge of at least two of the first plurality of data tracks under control of the servo system, and determining an error in the servo system based on the detected positions and the pitch of the data tracks.

In another example, a head positioning servo system includes a transducer head assembly having a magnetic write and read element, an optical servo system, and a controller. The controller includes logic for writing a first plurality of data tracks to a storage medium at a pitch without utilizing the optical servo system, detecting a position of an edge of at least two of the first plurality of data tracks under control of the optical servo system, and determining an error in the servo system based on the detected positions and the pitch of the data tracks.

According to another aspect and example of the present invention, a computer-readable medium comprising instructions for determining errors in a servo system is provided. In one example, the instructions are for causing the performance of a method including writing a first plurality of data tracks to a storage medium at a pitch, detecting a position of an edge of at least a two of the first plurality of data tracks under control of a servo system, and determining an error in the servo system based on the detected positions and the pitch of the data tracks.

The present invention and its various embodiments are better understood upon consideration of the detailed description below in conjunction with the accompanying drawings and claims.

BRIEF DESCRIPTION OF DRAWINGS

FIGS. 3-5 illustrate an exemplary method for writing data tracks at a known pitch;

DETAILED DESCRIPTION

Figure 1:
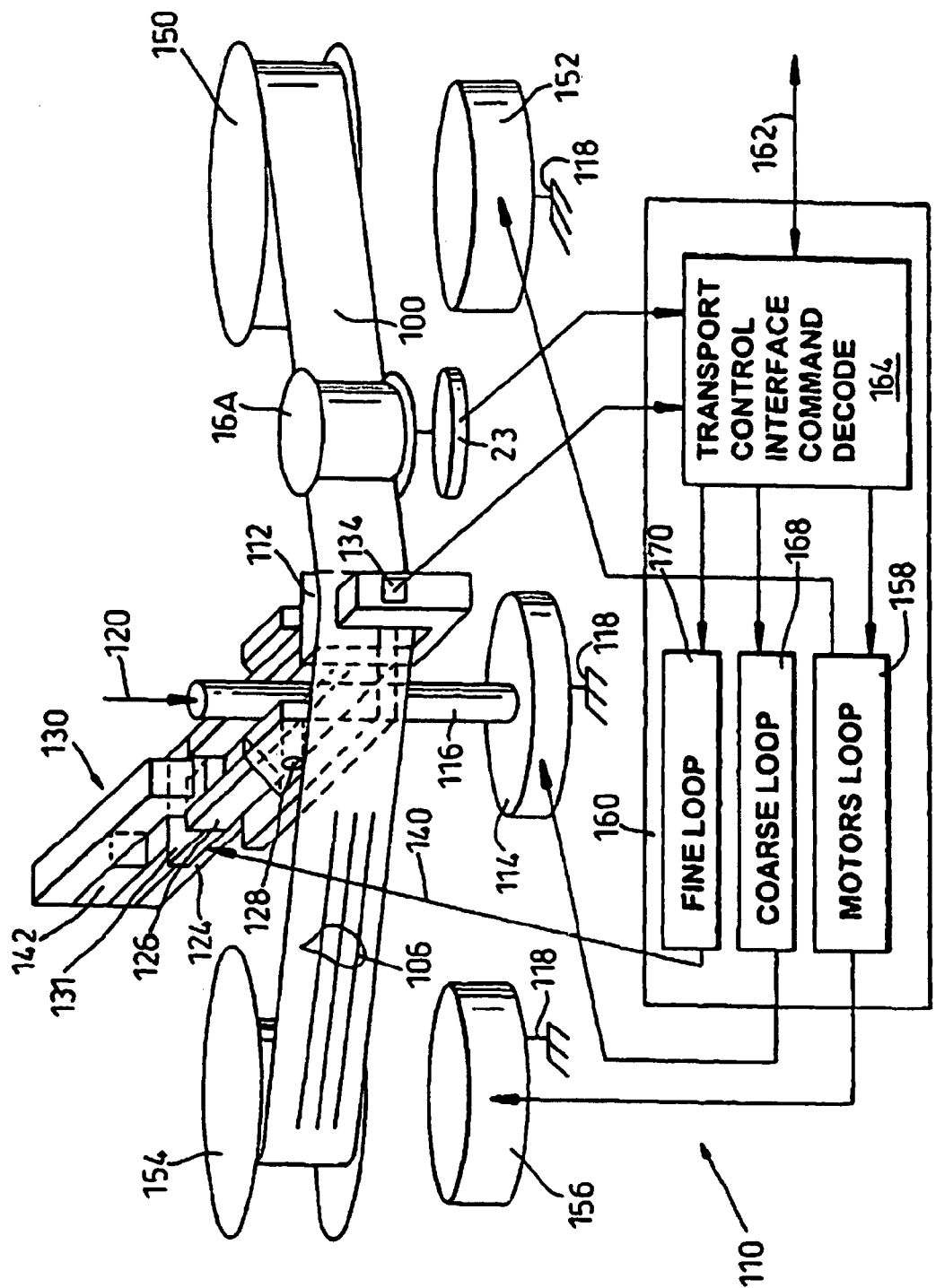
FIG. 1 illustrates an isometric and electrical block view of an exemplary multi-channel magnetic storage system employing an optical tracking servo system.

Various methods and systems for providing calibration and/or position information for a servo system, e.g., a primary servo system or subsystem servo system, are provided. The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions.

Typical optical servo system included with magnetic tape drives generally operate by directing light, e.g., a laser beam, to a known pattern of optical indicia associated with the magnetic tape. One drawback of such optical servo systems, however, is that the optical beam/laser "spot" may not be well matched to the individual indicia or "dot" marks on the tape. Further, some optical systems rely on three laser spots, which track three servo tracks to provide a linear sine wave, however, if the spots and tracks mismatch, non-linear errors may be introduced. The "mismatch" can result from any number of mechanical, optical, and/or electrical contributors during the drive and/or component manufacturing. The "mismatch," sometimes referred to as a "non-linear" optical position error, may produce significant positional errors in the optical servo system, thereby limiting the storage capacity of tape drives.

In an attempt to reduce optical nonlinearity errors, various optical calibration methods along with very tight manufacturing limits have been implemented to the drive and the manufacturing process. Further, specific manufacturing calibrations and algorithms, with the intent to reduce the servo non-linearity, have been employed. Despite these various attempts to reduce errors in the servo system, errors remain a limiting factor in tape drive capacities.

In one example of the present invention, a hybrid servo system is described for determining positional error information of the drive servo system(s) based on previously written data structures (e.g., data tracks) and the drive servo system. In particular, the drive operates to write a plurality of data tracks on a segment of the storage tape having a known pitch (e.g., using track trimming techniques). The drive then determines the boundaries of the data tracks (e.g., via a read element) under control of the servo system. Errors in the drive servo system are then determined by comparing the detected position of the boundaries and/or pitch of the data tracks as determined under control of the servo system with the positions based on the known pitch that they were written with. In particular, writing the data tracks at a known pitch (or at least within a known tolerance) allows the system to determine that errors in the boundary positions of the data tracks determined under control of the servo system are a result of the drive servo system, e.g., a result of optical non-linearity in an optical servo system or the like.

Additionally, in one example, virtual tracking methods and systems are used for determining and correcting errors of a drive servo system, e.g., errors of a traditional optical servo system. For example, typically a tape drive includes a multi-channel magnetic head having a plurality of read-write elements positioned transversely across the magnetic storage tape. A virtual tracking system may write multiple sets of data tracks to a magnetic storage tape in parallel and according to a track trimming track format. The system may operate to equate the multiple written data tracks as a single virtual track written by a single virtual writer. Additionally, the virtual data track may be read by a single virtual reader in a manner similar to writing. The positional information and errors gathered from the multiple channels may then be used to correct the servo system positional errors.

Exemplary systems and methods described here may improve the position accuracy of a drive. Furthermore, some exemplary systems and methods described here may provide cost and accuracy enhancements over optical compensation without the need for hardware changes. In addition to determining errors in the drive servo system, various examples may further be used for a "per cartridge" correction to further reduce off-track errors.

Referring initially to FIG. 1, a magnetic recording tape 100 is shown being drawn through a tape drive mechanism 110 from a supply reel 150 to a take-up reel 154 along a tape path. Tape 100 is moved at a considerable linear relative velocity, such as 150 inches per second or more. The high velocity and contact between tape 100 and mechanical tape guide and head elements of tape drive 110 may result undesirable additional tape movements, a principal one of which being lateral tape motion ("LTM") or motion transverse to the nominal tape path. As discussed above, although mechanical steps are known to reduce LTM, at certain high linear track densities and narrow track widths it is not practical to rely entirely upon open loop tape mechanisms. Accordingly, the magnetic recording tape 100 includes an optical servo pattern 106 formed so as to be detected, in this example, at a reverse major surface of the tape relative to the magnetic storage tracks. A suitable optical servo pattern 106 may be applied during tape manufacturing, as by laser ablation, printing, or embossing.

Figure 2A:
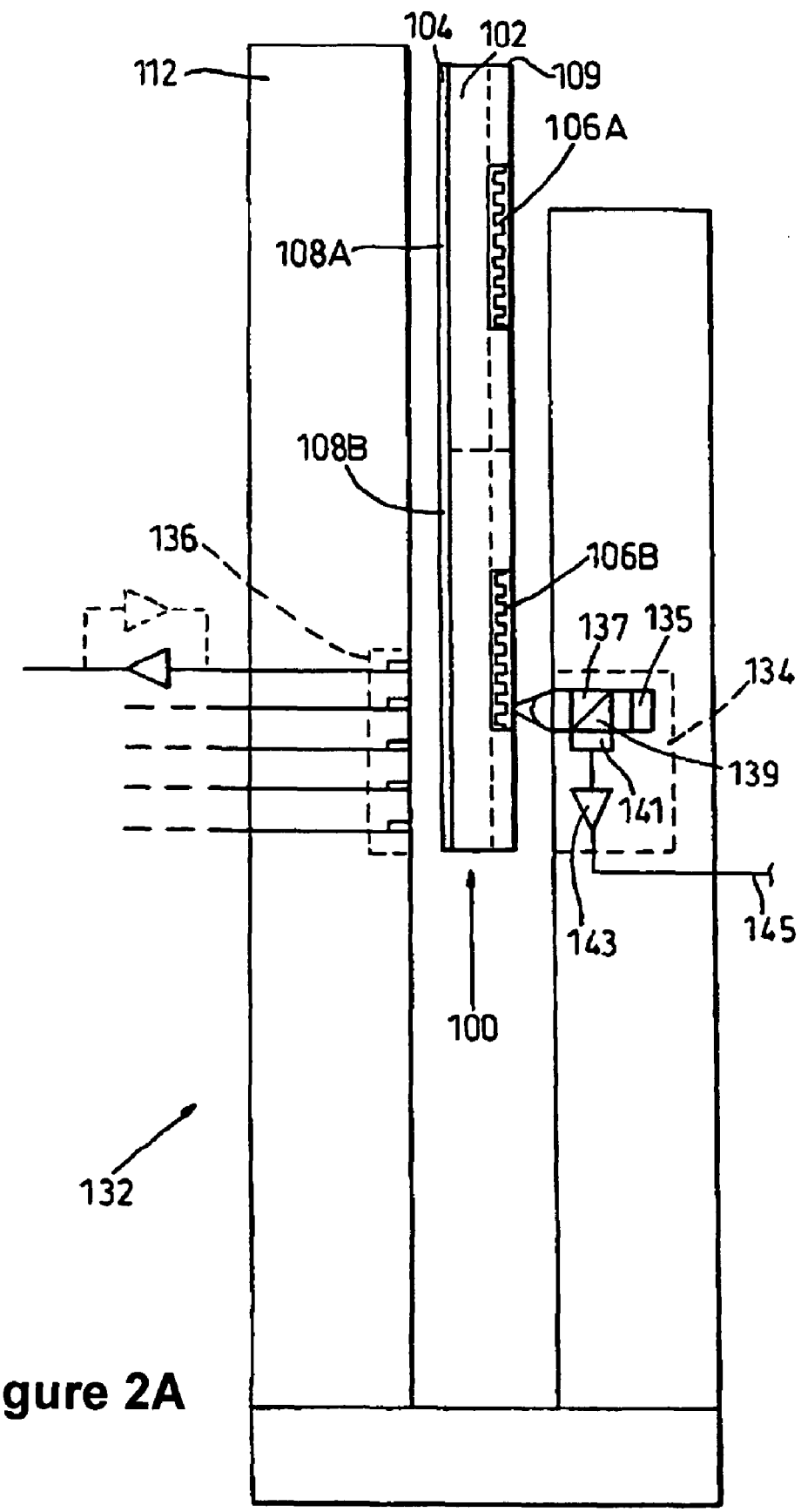
FIGS. 2A and 2B illustrate cross-sections of exemplary head assemblies for use with the system shown in FIG. 1.

Tape 100 provides for multiple linear magnetic data storage tracks defined in a magnetic storage layer thereof. Accordingly, the tape drive mechanism 110 includes a multi-channel magnetic head structure 112 having multiple read and write head elements aligned to read some of the magnetic data storage tracks. The write elements are preferably realized as thin film magnetic write structures, and the read elements may be thin film or magneto-resistive read elements. In FIG. 2A, a head array comprising e.g. five magneto-resistive read transducers is depicted within the head structure 112. While five heads are shown, in practice ten or twelve heads are typical for both writing and reading within the head structure 112. With the particular arrangement of heads shown in FIG. 2A, the effective recording area of the tape 100 is divided into multiple zones or bands of parallel magnetic recording tracks 108A and 108B formed in a recording layer 104, there being two zones 108A and 108B shown in FIG. 2A. This arrangement therefore requires a head positioner mechanism which coarsely positions the head structure 112 and head array 136 within a particular zone, e.g. zone 108B shown in FIG. 2A, and at nominal track set positions within each zone. Moreover, in order to follow LTM, the head positioner mechanism must provide for very rapid head position corrections tracking the LTM offsets. Generally, this requirement is satisfied by providing a head positioner mechanism which is corrected by an optical servo pattern 106 and by an optical servo feedback control 138. In the example presented by FIG. 2A this requirement is satisfied by providing e.g. two bands of optical servo patterns 106A and 106B, formed in an optical layer 109 (which may be formed with base layer 102).

The tape drive mechanism 110 shown in FIG. 1 includes a lateral coarse head positioner, including, e.g., an incremental step motor 114 and lead screw 116. The motor 114 is attached to a base 118, while the lead screw 116 may be rotationally mounted to the base 118 between the step motor 114 and a journal 120. As the step motor 114 rotates the lead screw, a lead screw follower block 122 follows the lead screw over a limited range of bi-directional lateral displacement dependent upon rotational direction of lead screw 116. A head mounting platform or structure 124 supports a head mounting beam structure or assembly 126. The head mounting beam 126 includes a pivot or fulcrum 128 which enables the beam 126 to pivot about the platform 124 over a very limited range of rotational displacement in a lateral or transverse direction relative to a main longitudinal axis (direction of travel) of tape 100. A limited displacement force is provided by a voice coil motor 130 extending on one side of the pivot 128, while a magnetic/optical tape head assembly 132 including the head structure 112 and head array 136 is provided on an opposite side of the pivot 128. The magnetic/optical tape head assembly 132 is generally U-shaped and includes on one inside wall the multi-channel magnetic transducer head array 112, and on an opposite inside wall an optical servo head 134. The coarse head positioner therefore positions the head assembly 132 at each zone, and at each track set within the particular zone. For each track set there is provided an optical servo tracking pattern, so that if the optical servo head follows the appropriate tracking pattern during linear tape movement, the magnetic head array 136 will follow the tracks 108 of the particular track set.

A supply reel 150 supplies the tape 100 into the mechanism 110. The reel 150 is preferably a part of a single-reel tape cartridge which includes a suitable buckling mechanism. The cartridge and buckling mechanism are conventional and are not described further. The reel 150 is rotationally engaged by a supply reel drive motor 152. A take-up reel 154 within the transport 110 is controlled by a take-up reel drive motor 156. The motors 152 and 156 are controlled independently by a motors control servo loop 158 in order to provide an appropriate amount of tension on the tape 100 irrespective of the relative diameters of the tape spools formed on the reels 150 and 154 at any particular time. A tape guide roller 16A is shown coupled to a tape speed sensing device, such as tachometer 23. The tachometer 23 is used conventionally by the motors control loop 158 in controlling relative torque applied by each of the motors 150 and 152.

Controller 160 includes or accesses logic for carrying out functions described herein, including error detection and compensation. In one example, controller 160 includes a data and command interface bus 162 enabling the transport 110 to be connected to a computing environment. An interface command decode and user data processing unit 164 provides conventional tape command decode and status functions, and user data compression and expansion functions as well as error correction processes, including non-linear error detection and correction as described. It also supervises the motors loop 158, a coarse head position control loop 168 and a fine head position control loop 170. The coarse head position control loop 168 is used to control the stepper motor 114 to position the head structure 112 at each nominal track set location. It should be understood that the transport 110 includes a plurality of parallel user data channels, such as 6-12 channels, and that each nominal coarse head position locates the head structure 112 at approximately each set of 6-12 tracks. The fine head position control loop 170 responds to instantaneous tape position information sensed by e.g. the optical pickup head 134 from one of the servo track patterns 106 which corresponds to the set or group of lineal tracks presently being followed. Any positional offset or position error sensed by the optical head 134 will result in a corrective driving current passing through a voice coil 131 of the voice coil motor 130. This current will apply a torque force to the pivoting dual beam structure 126, and the head structure 112 will be returned to correct alignment with the magnetic data record tape tracks being followed as the optical head 134 follows a particular servo track pattern 106.

The optical servo track patterns 106 may provide continuous or discrete position error signals. Each track may be encoded with a unique value or code which enables the optical head and main control module 164 to determine which nominal servo track 106 is being followed. Advantageously, the servo track patterns 106 may be formed as a part of the tape manufacturing process, with the result that there need be no separate magnetic servo track writing operation as part of tape manufacturing. Conventional laser inscribing, embossing or patterning techniques may be used in real time during tape manufacture to provide the tracks 106.

As shown in FIG. 2A, the optical servo head 134 may conventionally include a laser light source 135, an optical path 137 including lenses and a beam splitter 139, a photo detector array 141, and preamplifier 143, such that a light beam may be focused upon a particular one of the servo patterns 106 on the reverse major side of the tape and result in electronically discernible LTM position error signals at the preamplifier 143. A resultant electrical error signal on a path 145 is sent to the optical servo feedback fine loop control block 170 within controller 160. The block 170 generates a bi-directional head position correction driving current and applies the driving current via a path 140 to the lateral voice coil 131 of voice coil motor 130 which results in a servo bias torque. The bias torque is applied through the support structure 124 and head mounting beam structure 126 to pivot the magnetic/optical head assembly 132 about the journal 128 and thereby follow the tape 100 despite the presence of LTM. Ideally, the fine position servo feedback control block 170 operates continuously in real time to apply head position correction currents to the lateral voice coil of voice coil motor 130. The fine position servo loop has a high bandwidth, and the beam assembly 126 including voice coil 131 and head structure 132 has a low mass, such that position corrections may be applied and effected very rapidly to minimize any tracking errors.

The voice coil motor 130 includes in addition to the voice coil 131 a fixed portion 142 carrying e.g. a suitably magnetized permanent magnet. The fixed portion 142 is mechanically attached to the lead screw follower platform 122 by a suitable support bar. The voice coil 131 receives a head position correction current over the path 140 from the fine position servo feedback control block 170 and creates a magnetic field which interacts dynamically with a magnetic field provided by the permanent magnet of the fixed portion 142, such that a fine position correction force is generated which incrementally pivots the rigid beam structure 126 laterally to correct for LTM. The voice coil actuator motor 130 may comprise a permanent magnet/coil combination, or it may comprise a piezoelectric effect motive device. The head mounting structure pivot 128 may be freely rotatable relative to the bar 124 with the head mounting structure 126 mechanically biased to a neutral position, the bias being overcome by rotational force applied by the lateral voice coil actuator 130. Alternatively, the pivot 128 may be fixed to the bar 124 which thereupon functions as a torsion bar enabling limited range lateral displacement of the head mounting structure 126 in response to the driving force applied by the voice coil motor 130.

The optical servo head may comprise a suitable arrangement of light source and photo detector array, together with suitable integrated on-board amplifiers. Exemplary optical heads and optical servo systems are described, for example, in U.S. Pat. Nos. 5,615,205 and 6,246,535, the disclosures thereof being incorporated herein by reference in their entirety. In another example, an optical head may be similar to one which is described in an article by Yoshikawa, Nakanishi, Itoh, Yamazaki, Komino and Musha entitled: "Laser-Detector-Hologram Unit for Thin Optical Pick-up Head of a CD Player", *IEEE Trans. on Components. Packaging & Mfg. Tech*. Part B, Vol. 18, No. 2, May 1995, pp. 245-249, the disclosure thereof being incorporated herein by reference.

Figure 2B:
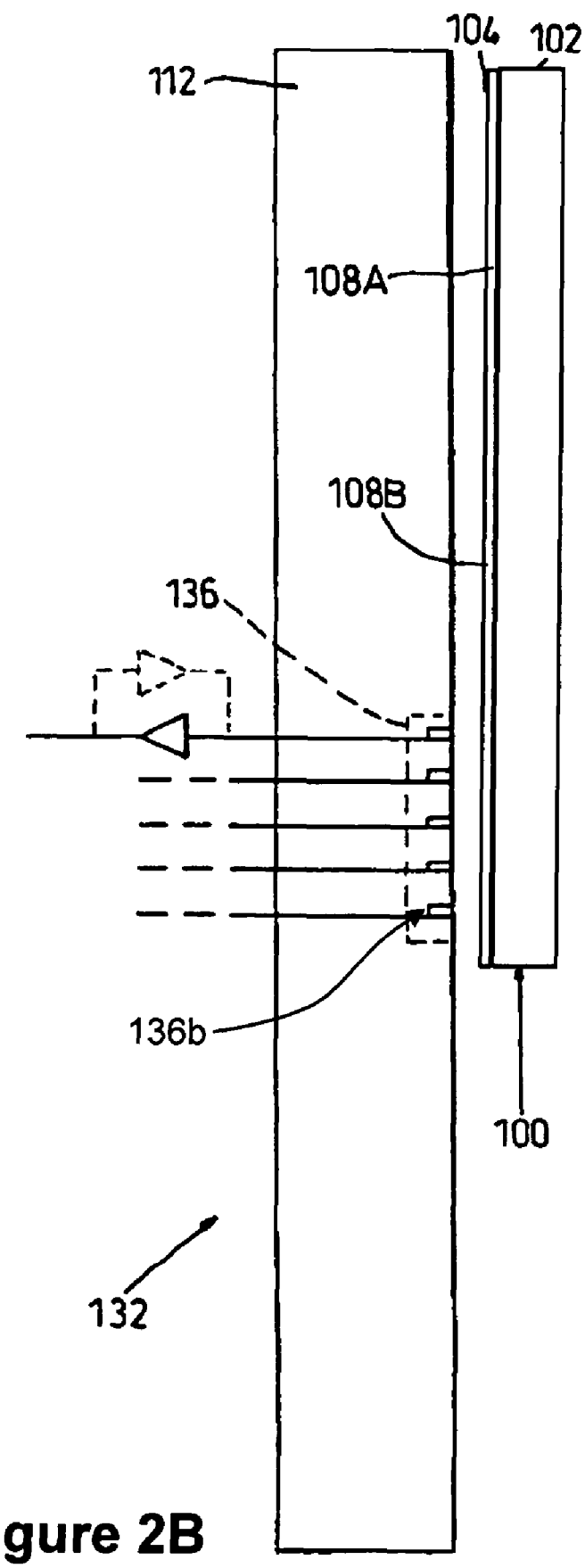

FIG. 2B illustrates another exemplary head structure 112b, which is similar to head structure 112, but utilizes a magnetic servo system, including servo element 136b, to track a magnetic servo track or feature of tape 100. For example, within or separate from head array 136 one or more magnetic servo elements 136b may be included for tracking a magnetic servo track formed with recording layer 104. Typically, two magnetic servo elements 136 would be included, one on each end of the head array 136 for tracking two magnetic servo tracks, but any number or configuration of magnetic servo elements are possible.

Accordingly, the exemplary error detection and compensation methods and systems herein are applicable to drives utilizing magnetic servo systems, optical servo systems, or combinations thereof. For example, the exemplary methods and systems are applicable to Linear Tape-Open (LTO) drives, Digital Linear Tape (DLT) drives, Super DLT (SDLT) drives, and so on.

Figure 5:
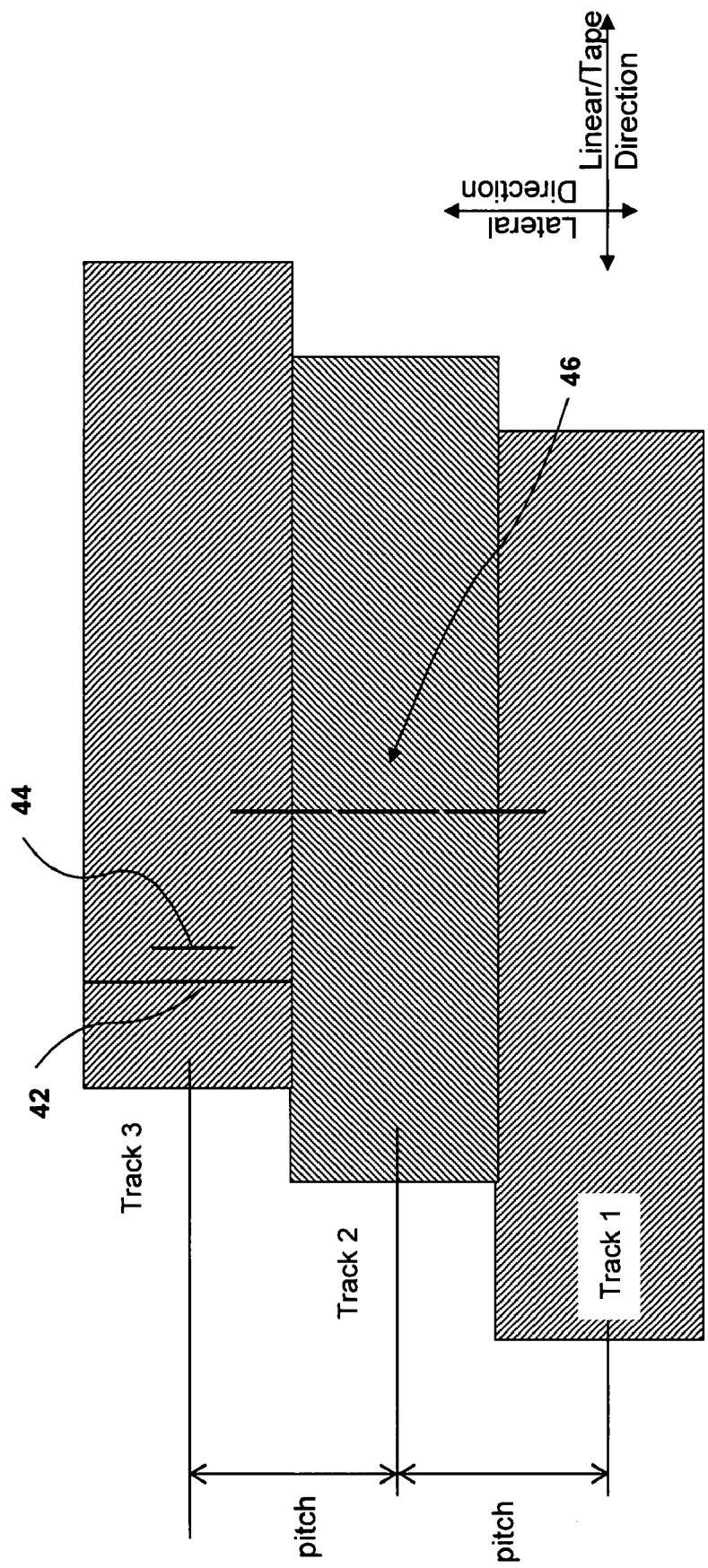

FIGS. 3-5 illustrate an exemplary writing process for writing a plurality of data tracks to a segment of a storage tape at a known pitch. In particular, FIGS. 3-5 illustrate writing a plurality of data tracks according to a track trimming format, wherein each track references a previously written data track and partially overlaps (or "trim") the previously written data track. Exemplary writing processes described, wherein a previously written data track is partially overwritten, are similar to those described in previously filed U.S. patent application Ser. No. 10/861,220, entitled "DUAL SOURCE TRACKING SERVO SYSTEMS AND ASSOCIATED METHODS," which is incorporated herein by reference in its entirety. The exemplary writing processes may further be extended to a "virtual" writing process (as described in greater detail with reference to FIG. 7), wherein a plurality of write elements write data tracks in parallel to offset sections of the storage tape.

FIG. 3 illustrates a first forward written data track, Track 1, using the forward elements of a head. In particular, write element 42 and data read element 44 are disposed at nominal locations with track center and servo read elements 46, including top servo read element 46a, center servo read element 46b, and bottom servo read element 46c, are laterally and longitudinally displaced to data read element 44. In other examples, servo read elements 46 may vary in number (e.g., only one or two read elements) and position (e.g., different lateral and/or longitudinal displacements), and may further include backward read elements associated with the drive head.

In one exemplary process, a first data track, Track 1, is written to the servo/LTM capability of the tape drive, e.g., open loop or with other drive servo systems, and servo read elements 46a, 46b, and 46c are not used. The lateral width of write element 42 and recorded Track 1 are equal to or greater than the total of the desired minimum track width for read back and the desired maximum distribution of the LTM, e.g., six times the standard deviation. Data Track 1 will be trimmed when the next track, Track 2, is written and the width of Track 1 is therefore written initially larger than needed for successful read back.

In one example, Track 1 is written to only a small portion of the magnetic storage tape, for example, a few centimeters to meters. Further, Track 1 may be written to a calibration region of the magnetic storage tape, and may include any detectable pattern of data.

FIG. 4 illustrates an exemplary writing process for writing the second forward written data track, Track 2, adjacent to and overlapping or trimming the width of Track 1. Track 2 is written relative to Track 1 based on signals from read elements 46 (and without utilizing the optical servo system). The nominal orientation of writer element 42 and servo read elements 46 to the previously written Track 1 is shown. In one example, the drive system will position write element 42 based on servo signals from servo read elements 46 such that the first written data Track 2 is written at a known offset (and thus known pitch) relative to Track 1.

In this example, servo read elements 46 are positioned at track center of Track 1 to provide position information for the head and write element 42. For example, the spatial relationship between servo read elements 46 and write element 42 is such that by following the center of Track 1 with servo elements 46, Track 2 is written at a known offset or pitch relative to Track 1. In other examples, read elements may be disposed to follow one or more track edges of a previously written track or combinations of following a track center and track edge.

For example, if the read element and write element are fixed with respect to each other for a desired track width and spacing, a read signal indicating that the read element is drifting or offset from the reference track indicates to the servo system that the track being written is also drifting or offset from a desired position relative to the reference track. Signals that can be used to determine the tracking information include, e.g., track average amplitude, average energy of the reference track, average energy of the read gate (or "rdgate") signal, PLL-locked/unlocked, transition from readable to unreadable data, k-bit, error rate information, and other suitable read/write parametrics that change as a function of track offset as discussed above.

In other examples, where one or more read elements are disposed adjacent one or more edges of a previously written data track, a track is determined to be correctly positioned relative to the previously written data track if the previously written data track can be successfully read by the read element (e.g., within desired error rates, etc.). If the previously written data track cannot be successfully read (e.g., by monitoring data validity characteristics or the like), then the head is repositioned to move laterally until the track is successfully read. Alternatively or additionally, two or more servo heads may be placed at opposing edges of a previously written data track and signals monitored to determine relative position information for writing data tracks.

FIG. 5 illustrates the further progression of writing a plurality of data tracks. The third written forward data track, Track 3, is written adjacent and overlapping Track 2 by sensing the position of Track 2 with servo elements 46 similar to the writing of Track 2 adjacent to Track 1 by reading Track 1. Additional tracks may be written with each iteration using the previously written data track to provide positioning information and resulting in a set of data tracks having a known pitch.

It will be recognized by those of skill in the art that various other servo read head designs and methods, e.g., any number of servo read elements and configurations, as well as methods for determining a pitch of the data tracks, are possible. For example, a servo read element may be configured to straddle two previously written data tracks and sense embedded servo signals in the previously written data tracks. As is well known in the art, alternating tracks may include embedded pilot tones at varying frequencies and the servo read element detects and compares the pilot tones to determine position information.

It should be recognized that the exemplary methods of obtaining and positioning a data track adjacent a previously data track are illustrative only and various other methods and head configurations may be employed to gather positional information from a previously written data track. Further, various exemplary transducer heads may be used with the exemplary methods and systems. One exemplary head design includes a center tapped head having two or more read elements where one or more read elements are dedicated read elements positioned to derive servo positioning information from an adjacent data track.

Figure 6:
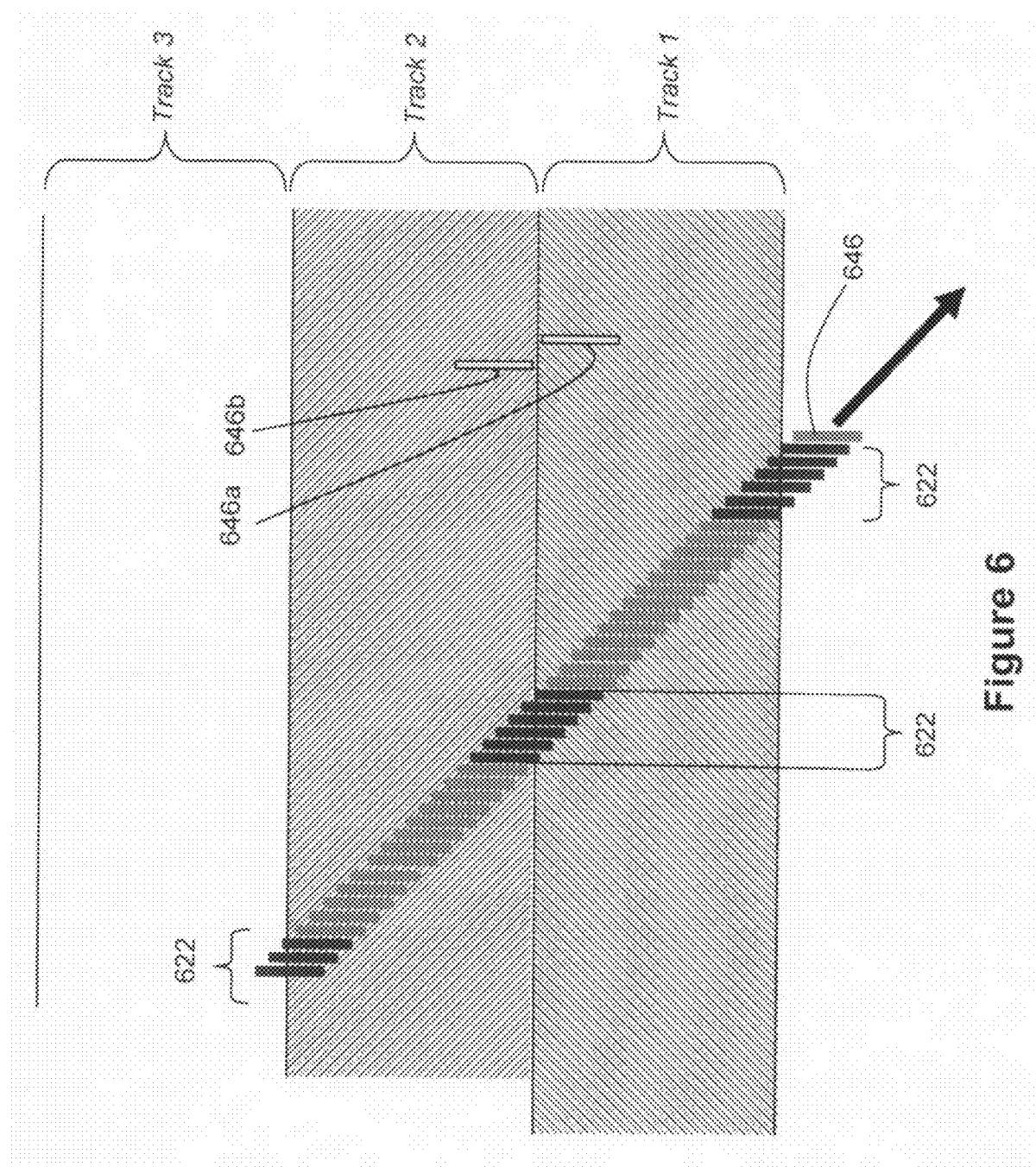
FIG. 6 illustrates an exemplary method for detecting edge boundaries under the control of the drive servo system.

FIG. 6 illustrates an exemplary process for detecting data track edges (or boundaries) of the previously written data tracks under the control of the drive servo system. A signal generated by a read element 646 as it crosses data track edges will be modulated, e.g., in regions 622, in a fairly predictable manner. For example, as shown to the right side of FIG. 6, two positions of read element 646, e.g., 646a and 646b, are shown on either side of a data track boundary between Track 1 and Track 2. As read element 646 moves from position of 646a to 646b, the read signal will vary, thereby indicating a track edge. For example, tape drives typically use various architectures and methods to encode, decode, and detect data integrity (such as BBD, QMC, and the like.) such that as read element 646 approaches and crosses the edge of a data track, a combination of signal loss and noise coupling from adjacent tracks generally excites the detection algorithms, indicating a data track edge.

With reference to the left side of FIG. 6, read element 646 is illustrated scanning in a lateral direction across the data tracks (including across data track edges). In one example, read element 646 is moved under the control of the servo system to read a portion of the tape, move laterally a small amount relative to the data tracks (e.g., less than 10% of the width of a data track), read another portion, and so on, thereby scanning across the data tracks and determining data track edges. The data track edge information may then be used to compute data track centerlines, pitches, and so on for comparison with the pitch they were written at.

Determinations of the data track edges (which may be related to track centerlines, widths, and track pitch) by read element 646 under the control of the drive servo system can be related to the known values of the track pitch, widths, and center positions, based on the process of writing the data tracks described with respect to FIG. 3-5. The track edges, pitch, centerlines, etc., should match the known values and variations in the values can be attributed to errors in the drive servo system, e.g., optical servo errors, electrical errors, or the like. Such errors may be determined at various vertical locations relative to the data tracks and used to correct errors in the optical servo system. The drive system, e.g., controller 160 of FIG. 1, may invert the errors and sum them back into tables or algorithms for the servo system such that the errors are compensated for by the known errors in the servo system, effectively dropping out the errors.

In one example, the pitch of the data tracks (e.g., Track 1, Track 2, and so on) is set to a non-devisable interval with respect to the pitch of the optical servo track. For example, the magnetic data track pitch set to 5.4 microns for an optical servo track pitch of 12 microns. Using a non-devisable pitch ensures the two curves (i.e., the pitch of the data tracks and servo tracks) recess to span the entire non-linearity period of the optical servo system.

The exemplary calibration process (e.g., determining servo errors and compensations tables or algorithms) may be carried out for a drive when an optical servo system is initially installed. Further, the exemplary calibration process may take place for each loaded cartridge to further determine cartridge specific errors, thereby providing "per cartridge" error correction. The per cartridge error data may be stored with the drive and/or the cartridge.

The described writing process and track edge detection may further be carried out in parallel by two or more write elements associated with different channels of a drive head. For example, a plurality of two or more write elements of a drive system may write data tracks as shown in FIGS. 3-5 in parallel, e.g., to separate regions (or bands) of the storage tape. Further, the plurality of data tracks written in parallel (and subsequently read in parallel) may form a virtual data track used similarly as described for determining track boundaries and servo errors.

Figure 7:
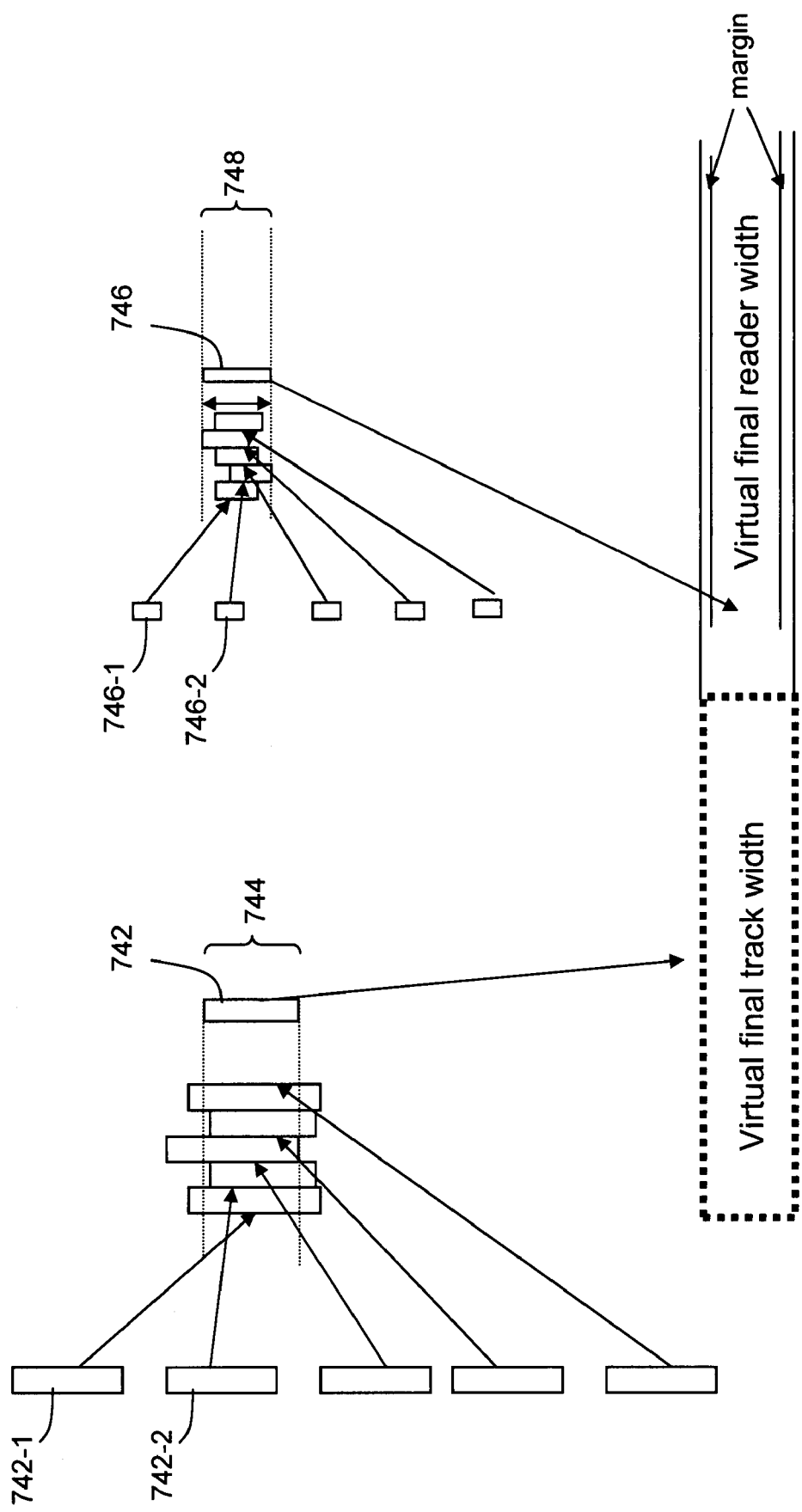
FIG. 7 illustrates conceptually an exemplary virtual tape servo system and method.

FIG. 7 illustrates conceptually an exemplary virtual tape servo writing process which may be used to write multiple sets of data tracks and determine data track boundaries, centerlines, pitches, and so on. In one example, and broadly speaking, a virtual tape servo architecture references a single virtual writer 742 and a single virtual reader 746 associated with multiple write elements 742-1, 742-2, etc., and reader elements 746-1, 746-2, etc. For example, a multi-channel read/write head, e.g., including multiple write heads and read heads is considered as having a single write head 742, which writes a single "virtual" data track having a width 744, and having a single virtual read head 746 having a width 748.

Multiple write elements 742-1, 742-2, etc., write a plurality of data tracks as a single virtual writer 742. The plurality of data tracks are written in a track trimming format, wherein a virtual data track partially overwrites a previously written virtual data track at a known pitch similar to the process described for a single write element. The multiple read elements 746-1, 746-2, etc. then scan across the plurality of virtual data tracks to detect track boundaries associated with the multiple data tracks. Differences in the detected virtual top and bottom edges of the virtual data tracks may be used to determine errors in the optical servo system.

Illustrative Example:

With reference to the Table below and FIGS. 8 and 9, an example of non-linear error detection and compensation is described. In particular, data from two SDLT tape drives operating according to methods described herein illustrate the detection and compensation for optical non-linearity of the optical servo system, thereby generating a "true" linear position signal, irrespective of the causes of the non-linearity error common to the optical servo systems used in SDLT drives.

In this example, sets of magnetic tracks were written according to the track trimming format and according to the virtual writing method described with respect to FIG. 7, the tracks having a pitch set to a non-devisable interval with respect to the optical servo marks such that the two curves recess to span the entire non linearity period of the optical servo marks. In this particular example, the optical servo marks having a pitch of 12 microns and the data tracks written having a pitch of 5.4 microns. The magnetic data tracks are then scanned and ready by multiple read elements according to the virtual reading method, where the magnetic detection signal crossings (i.e., detecting the track edges) are recorded as a function of off-track position.

The track edges occur at very specific locations away from track center, and by mapping the response of the data integrity signals as a function of off-track position errors may be determined. In particular, the mapping provides linear position information that is used by the system (e.g., by the drive controller) to measure and correct for the optical non-linearity. In this instance, the cyclical nature of the optical nonlinearity enables a Modulo (K) calculation to normalize the optical servo (PWL) values and to provide a non-linearity correction (see, e.g., columns labeled corrected magnetic NL "top and bottom").

It should be recognized by those of ordinary skill in the art that the exemplary servo methods for writing data tracks and detect track edges are illustrative only and various modifications (including additions and subtractions of devices or actions) to the above methods and systems are possible. Additionally, various methods and systems may be used in combination with other track writing and servo error methods and systems.

The above detailed description is provided to illustrate exemplary embodiments and is not intended to be limiting. It will be apparent to those of ordinary skill in the art that numerous modification and variations within the scope of the present invention are possible. For example, various exemplary methods and systems described herein may be used

TABLE

| PWL Mod 12 | Virtual Track Servo (VTS) Top | VTS Bottom | Optical Non-linearity (NL) | Track Width | Magnetic corrected Top, VTS NL. | Magnetic corrected Bottom VTS NL |
|---|---|---|---|---|---|---|
| 0.234375 | −0.13992 | 0.086484 | −0.02203 | 5.34375 | −0.11789 | 0.108516 |
| 0.84375 | −0.32742 | −0.14789 | −0.23297 | 5.390625 | −0.09445 | 0.085078 |
| 1.453125 | −0.23367 | −0.56977 | −0.39703 | 5.90625 | 0.163359 | −0.17273 |
| 1.921875 | −0.21023 | −0.07758 | −0.13922 | 5.4375 | −0.07102 | 0.061641 |
| 2.015625 | −0.58523 | −0.35883 | −0.46734 | 5.34375 | −0.11789 | 0.108516 |
| 2.039063 | −0.3743 | −0.24164 | −0.30328 | 5.4375 | −0.07102 | 0.061641 |
| 2.0625 | −0.28055 | −0.42914 | −0.35016 | 5.71875 | 0.069609 | −0.07898 |
| 2.085938 | −0.42117 | −0.49945 | −0.46734 | 5.648438 | 0.046172 | −0.03211 |
| 2.53125 | −0.23367 | −0.33539 | −0.27984 | 5.671875 | 0.046172 | −0.05555 |
| 2.554688 | −0.11648 | −0.10102 | −0.11578 | 5.554688 | −0.0007 | 0.014766 |
| 2.695313 | −0.39773 | −0.07758 | −0.23297 | 5.25 | −0.16477 | 0.155391 |
| 3.1875 | 0.024141 | −0.26508 | −0.11578 | 5.859375 | 0.139922 | −0.1493 |
| 3.234375 | −0.04617 | −0.05414 | −0.04547 | 5.578125 | −0.0007 | −0.00867 |
| 3.867188 | −0.09305 | 0.063047 | −0.02203 | 5.414063 | −0.07102 | 0.085078 |
| 4.335938 | −0.11648 | 0.016172 | −0.04547 | 5.4375 | −0.07102 | 0.061641 |
| 4.453125 | 0.117891 | 0.016172 | 0.071719 | 5.671875 | 0.046172 | −0.05555 |
| 4.992188 | 0.164766 | −0.00727 | 0.071719 | 5.742188 | 0.093047 | −0.07898 |
| 5.625 | 0.164766 | 0.367734 | 0.259219 | 5.367188 | −0.09445 | 0.108516 |
| 6.234375 | 0.164766 | 0.367734 | 0.259219 | 5.367188 | −0.09445 | 0.108516 |
| 6.84375 | 0.188203 | −0.19477 | 0.001406 | 5.953125 | 0.186797 | −0.19617 |
| 7.453125 | 0.258516 | 0.156797 | 0.212344 | 5.671875 | 0.046172 | −0.05555 |
| 7.96875 | 0.328828 | 0.391172 | 0.352969 | 5.507813 | −0.02414 | 0.038203 |
| 8.625 | 0.352266 | 0.438047 | 0.399844 | 5.484375 | −0.04758 | 0.038203 |
| 8.671875 | 0.211641 | 0.297422 | 0.259219 | 5.484375 | −0.04758 | 0.038203 |
| 9.140625 | 0.352266 | 0.320859 | 0.329531 | 5.601563 | 0.022734 | −0.00867 |
| 9.1875 | 0.375703 | 0.414609 | 0.399844 | 5.53125 | −0.02414 | 0.014766 |
| 9.234375 | 0.164766 | 0.391172 | 0.282656 | 5.34375 | −0.11789 | 0.108516 |
| 9.726563 | 0.117891 | 0.086484 | 0.095156 | 5.601563 | 0.022734 | −0.00867 |
| 9.75 | 0.164766 | −0.05414 | 0.048281 | 5.789063 | 0.116484 | −0.10242 |
| 9.820313 | 0.117891 | −0.05414 | 0.024844 | 5.742188 | 0.093047 | −0.07898 |
| 9.890625 | 0.047578 | −0.10102 | −0.02203 | 5.71875 | 0.069609 | −0.07898 |
| 10.35938 | 0.211641 | 0.180234 | 0.188906 | 5.601563 | 0.022734 | −0.00867 |
| 10.42969 | −0.02273 | 0.039609 | 0.001406 | 5.507813 | −0.02414 | 0.038203 |
| 11.01563 | 0.117891 | −0.0307 | 0.048281 | 5.71875 | 0.069609 | −0.07898 |
| 11.0625 | −0.16336 | −0.10102 | −0.13922 | 5.507813 | −0.02414 | 0.038203 |
| 11.64844 | 0.117891 | 0.063047 | 0.095156 | 5.625 | 0.022734 | −0.03211 |

Figure 8:
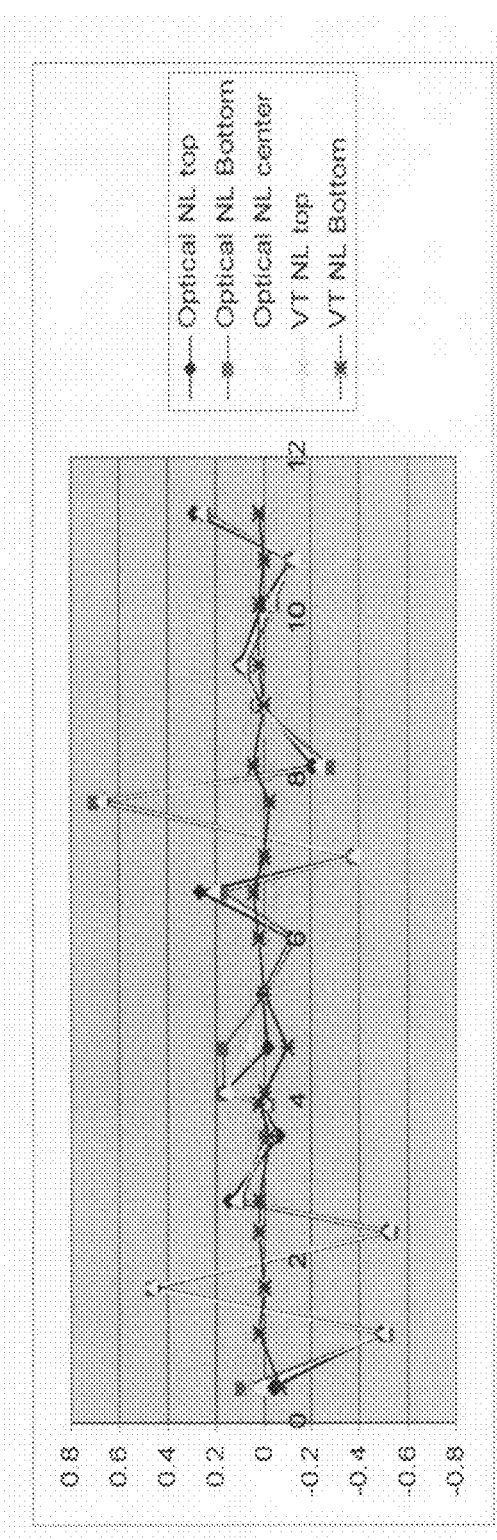
FIGS. 8 and 9 illustrate data comparing the use of conventional servo systems with and without error compensation based on detection of track features according to one example.
Figure 9:
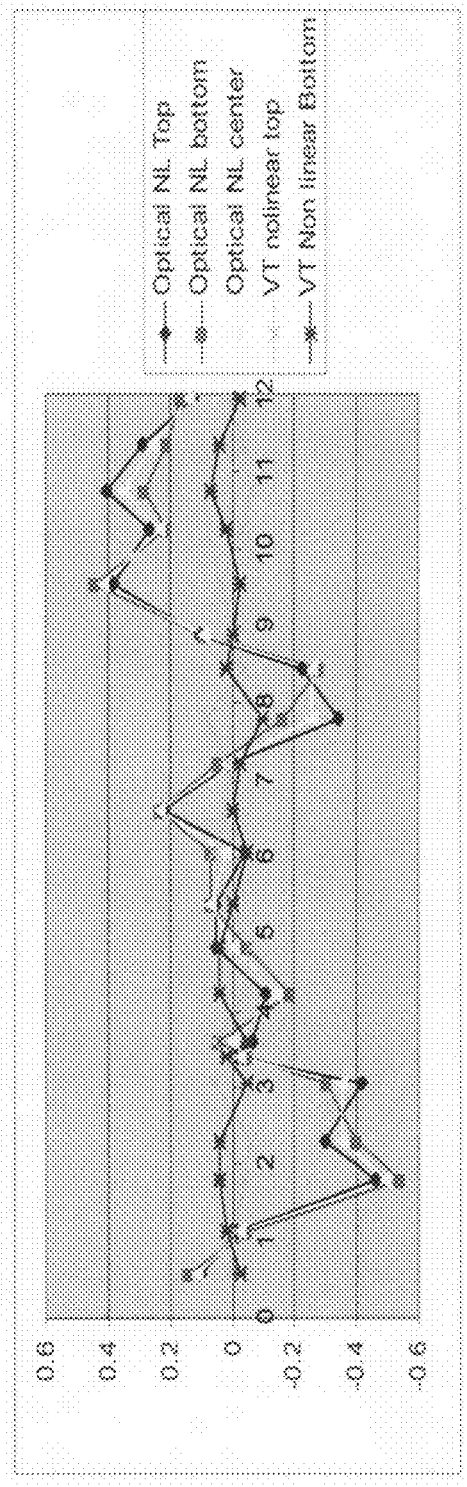

FIGS. 8 and 9 illustrate graphically comparisons of two DSLT drives, having conventional optical servo systems, operating with and without error compensation based on detection of track features as described. As illustrated in both graphs, the non-linearity errors of the two drives is improved significantly with the exemplary methods for detecting and compensating for errors in the optical servo system. Accordingly, the exemplary methods and systems may improve the position accuracy of a drive (e.g., employing an optical servo system such as in SDLT drives), without the need for significant cost or hardware changes to the drive or optical servo system.

alone or in combination with various other positional and/or servo methods and systems whether described herein or otherwise including, e.g., optical or magnetic servo methods and systems. Additionally, particular examples have been discussed and how these examples are thought to address certain disadvantages in related art. This discussion is not meant, however, to restrict the various examples to methods and/or systems that actually address or solve the disadvantages.

Finally, please note that in those instances, if any, where the same reference numeral or letter in the text refers to different elements in different figures, please refer to the figure being locally discussed in the text as the proper context to associate the reference numeral or letter with the correct element as would be logically apparent to those skilled in the art.

The invention claimed is:

1. A method for detecting errors in a positional servo system of a magnetic storage drive, the method comprising:
writing a first virtual track comprising a plurality of first calibration tracks;
moving a write element controlled by the positional servo system for a predetermined first distance;
writing a second virtual track comprising a plurality of second calibration tracks, wherein each of the second calibration tracks is adjacent to one of the first calibration tracks and overlaps with its adjacent first calibration track, such that the first calibration tracks and the second calibration tracks form a plurality pairs of overlapping first and second calibration tracks;
for each pair of overlapping first and second calibration tracks,
detecting a first position of the first calibration track of the pair;
detecting a second position of a boundary between the first calibration track and the second calibration track of the pair; and
determining a second distance between the first position and the second position;
determining first errors in the positional servo system at the first positions as differences between the predetermined first distance and the second distances obtained from all the pairs of overlapping first and second calibration tracks, respectively.

2. The method of claim 1, further comprising recording the first errors in the positional servo system at the first positions on the magnetic storage drive.

3. The method of claim 1, wherein
for each pair of overlapping first and second calibration tracks, the first position of the first calibration track is at the center of the first calibration track.

4. The method of claim 3,
wherein for each pair of overlapping first and second calibration tracks, the first position of the first calibration track is at an edge of the first calibration track that is opposite to the boundary between the first calibration track and the second calibration track of the pair.

5. The method of claim 1, wherein the positional servo system comprises an optical servo system.

6. The method of claim 1, wherein the positional servo system comprises a magnetic servo system.

7. The method of claim 1, wherein
the first calibration tracks are written concurrently; and
the second calibration tracks are written concurrently.

8. The method of claim 1, further comprising:
moving the write element controlled by the positional servo system for the predetermined first distance;
writing a third virtual track comprising a plurality of third calibration tracks, wherein each of the third calibration tracks is adjacent to one of the second calibration tracks and overlaps with its adjacent second calibration track, such that the second calibration tracks and the third calibration tracks form a plurality pairs of overlapping second and third calibration tracks;
for each pair of overlapping second and third calibration tracks,
detecting a third position of the second calibration track of the pair;
detecting a fourth position of a boundary between the second calibration track and the third calibration track of the pair; and
determining a third distance between the third position and the fourth position;
determining second errors in the positional servo system at the third positions as differences between the predetermined first distance and the third distances obtained from all the pairs of overlapping second and third calibration tracks, respectively.

9. The method of claim 1, further comprising correcting the positional servo system at the first positions based on the first errors determined at the first positions.

10. The method of claim 1, further comprising normalizing an algorithm for use by the positional servo system based on the first errors.

11. The method of claim 8, further comprising generating a look-up table of errors for different lateral positions of a drive head based on the first errors and the second errors.

12. A head assembly system, comprising:
a transducer head comprising a magnetic write and read element;
a servo system;
a controller comprising logic for:
writing a first virtual track comprising a plurality of first calibration tracks;
moving a write element controlled by the positional servo system for a predetermined first distance;
writing a second virtual track comprising a plurality of second calibration tracks, wherein each of the second calibration tracks is adjacent to one of the first calibration tracks and overlaps with its adjacent first calibration track, such that the first calibration tracks and the second calibration tracks form a plurality pairs of overlapping first and second calibration tracks;
for each pair of overlapping first and second calibration tracks,
detecting a first position of the first calibration track of the pair;
detecting a second position of a boundary between the first calibration track and the second calibration track of the pair; and
determining a second distance between the first position and the second position;
determining first errors in the positional servo system at the first positions as differences between the predetermined first distance and the second distances obtained from all the pairs of overlapping first and second calibration tracks, respectively.

13. The system of claim 12, wherein the controller further comprises logic for recording the first errors in the positional servo system at the first positions on the magnetic storage drive.

14. The system of claim 12, wherein
for each pair of overlapping first and second calibration tracks, the first position of the first calibration track is at the center of the first calibration track.

15. The system of claim 14,
wherein for each pair of overlapping first and second calibration tracks, the first position of the first calibration track is at an edge of the first calibration track that is opposite to the boundary between the first calibration track and the second calibration track of the pair.

16. The system of claim 12, wherein
the first calibration tracks are written concurrently; and
the second calibration tracks are written concurrently.

17. The system of claim 12, the controller further comprises logic for:
moving the write element controlled by the positional servo system for the predetermined first distance;

writing a third virtual track comprising a plurality of third calibration tracks, wherein each of the third calibration tracks is adjacent to one of the second calibration tracks and overlaps with its adjacent second calibration track, such that the second calibration tracks and the third calibration tracks form a plurality pairs of overlapping second and third calibration tracks;

for each pair of overlapping second and third calibration tracks,
  detecting a third position of the second calibration track of the pair;
  detecting a fourth position of a boundary between the second calibration track and the third calibration track of the pair; and
  determining a third distance between the third position and the fourth position;
determining second errors in the positional servo system at the third positions as differences between the predetermined first distance and the third distances obtained from all the pairs of overlapping second and third calibration tracks, respectively.

18. The system of claim 12, wherein the control further comprises logic for correcting the positional servo system at the first positions based on the first errors determined at the first positions.

19. The system of claim 12, wherein the control further comprises logic for normalizing an algorithm for use by the positional servo system based on the first errors.

20. The system of claim 17, wherein the controller further comprises logic for generating a look-up table of errors for different lateral positions of the transducer head assembly based on the first errors and the second errors.

21. A head assembly system, comprising:
a transducer head comprising a magnetic write and read element;
an optical servo system;
a controller comprising logic operable for:
  writing a first virtual track comprising a plurality of first calibration tracks;
  moving a write element controlled by the positional servo system for a predetermined first distance;
  writing a second virtual track comprising a plurality of second calibration tracks, wherein each of the second calibration tracks is adjacent to one of the first calibration tracks and overlaps with its adjacent first calibration track, such that the first calibration tracks and the second calibration tracks form a plurality pairs of overlapping first and second calibration tracks;
  for each pair of overlapping first and second calibration tracks,
    detecting a first position of the first calibration track of the pair;
    detecting a second position of a boundary between the first calibration track and the second calibration track of the pair; and
    determining a second distance between the first position and the second position;
  determining first errors in the positional servo system at the first positions as differences between the predetermined first distance and the second distances obtained from all the pairs of overlapping first and second calibration tracks, respectively.

22. The system of claim 21, wherein the controller further comprises logic for recording the first errors in the positional servo system at the first positions on the magnetic storage drive.

23. The system of claim 21, wherein
for each pair of overlapping first and second calibration tracks, the first position of the first calibration track is at the center of the first calibration track.

24. The system of claim 23,
wherein for each pair of overlapping first and second calibration tracks, the first position of the first calibration track is at an edge of the first calibration track that is opposite to the boundary between the first calibration track and the second calibration track of the pair.

25. The system of claim 21, the controller further comprises logic for:
moving the write element controlled by the positional servo system for the predetermined first distance;
writing a third virtual track comprising a plurality of third calibration tracks, wherein each of the third calibration tracks is adjacent to one of the second calibration tracks and overlaps with its adjacent second calibration track, such that the second calibration tracks and the third calibration tracks form a plurality pairs of overlapping second and third calibration tracks;
for each pair of overlapping second and third calibration tracks,
  detecting a third position of the second calibration track of the pair;
  detecting a fourth position of a boundary between the second calibration track and the third calibration track of the pair; and
  determining a third distance between the third position and the fourth position;
determining second errors in the positional servo system at the third positions as differences between the predetermined first distance and the third distances obtained from all the pairs of overlapping second and third calibration tracks, respectively.

26. The system of claim 21, wherein the control further comprises logic for correcting the positional servo system at the first positions based on the first errors determined at the first positions.

27. The system of claim 21, wherein the control further comprises logic for normalizing an algorithm for use by the positional servo system based on the first errors.

28. The system of claim 25, wherein the controller further comprises logic for generating a look-up table of errors for different lateral positions of the transducer head assembly based on the first errors and the second errors.

29. A computer-readable medium comprising instructions for determining errors in a servo system, the instructions for causing the performance of the method comprising:
writing a first virtual track comprising a plurality of first calibration tracks;
moving a write element controlled by the positional servo system for a predetermined first distance;
writing a second virtual track comprising a plurality of second calibration tracks, wherein each of the second calibration tracks is adjacent to one of the first calibration tracks and overlaps with its adjacent first calibration track, such that the first calibration tracks and the second calibration tracks form a plurality pairs of overlapping first and second calibration tracks;
for each pair of overlapping first and second calibration tracks,
  detecting a first position of the first calibration track of the pair;
  detecting a second position of a boundary between the first calibration track and the second calibration track of the pair; and determining a second distance between the first position and the second position;

determining first errors in the positional servo system at the first positions as differences between the predetermined first distance and the second distances obtained from all the pairs of overlapping first and second calibration tracks, respectively.

30. A storage medium comprising: a data track region; and one or more calibration track regions, wherein each of the calibration track regions comprises a virtual track comprising a plurality of calibration tracks, wherein: the calibration tracks substantially span a width of the storage medium; adjacent ones of the calibration tracks overlap; and each two adjacent calibration tracks are written by writing the first one of the two adjacent calibration tracks, moving a write element controlled by a positional servo system for a predetermined first distance, and writing the second one of the two adjacent calibration tracks overlapping the first one of the two adjacent calibration tracks such that the first one of the adjacent calibration tracks and the second one of the adjacent calibration tracks form a pair of overlapping calibration tracks.

* * * * *